March 24, 1925.

P. R. G. BIEDERMANN 1,530,924

SLUSH PUMP VALVE

Filed March 22, 1924

INVENTOR
Paul Robert George Biedermann
BY
Borth & Borth
ATTORNEYS

Patented Mar. 24, 1925.

1,530,924

UNITED STATES PATENT OFFICE.

PAUL ROBERT GEORGE BIEDERMANN, OF TAFT, CALIFORNIA.

SLUSH-PUMP VALVE.

Application filed March 22, 1924. Serial No. 701,065.

*To all whom it may concern:*

Be it known that I, PAUL ROBERT GEORGE BIEDERMANN, a citizen of the United States, residing at Taft, in the county of Kern and State of California, have invented certain new and useful Improvements in Slush-Pump Valves, of which the following is a specification.

My invention relates to valves of a type suitable for use in the slush-pumps of well drilling apparatus, or for any other use in which the fluid passing through the valve contains a large amount of sand or other solid matter.

The object of my invention is to provide a valve of the described type which is simple and inexpensive in construction, effective in operation, and which will have a longer life than the valves now in common use under the described conditions.

It is to be understood that the construction of my valve may be varied, within the limits of the claim hereto appended, from the form herein described and illustrated, without departing from the essential principles of the invention as expressed in said claim.

My invention will now be fully described with reference to the accompanying drawings, wherein.

Figure 1:
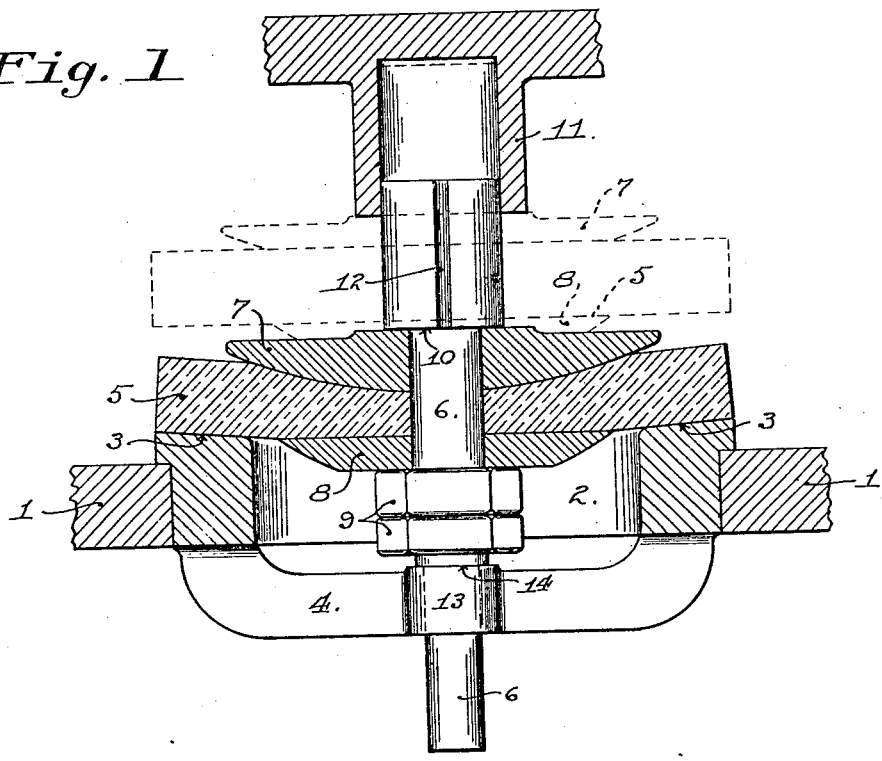
Fig. 1 is a central vertical section of my valve.
Figure 2:
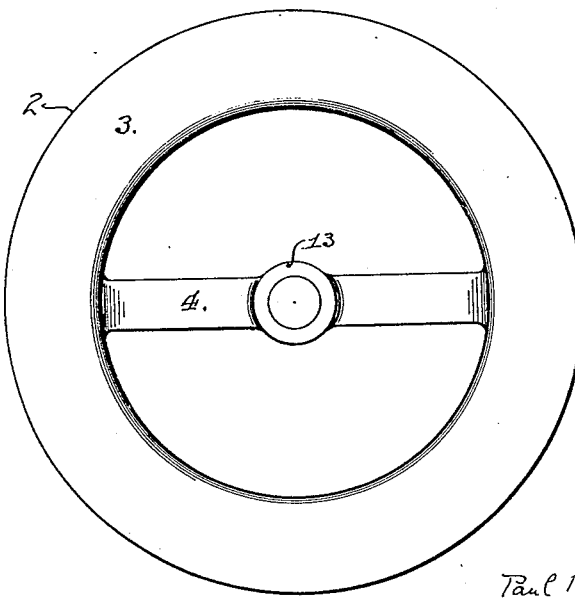
Fig. 2 is a plan view of the seat member.

In the drawings the reference numeral 1 designates a portion of the pump cylinder casting or other part in which the valve is mounted. 2 is an annular seat member set into the casting 1 and secured by any suitable means not shown. Said member 2 has an annular seat 3 and of substantial width slightly tapered or inclined inwardly as shown. Said member 2 is also provided with a transverse bridge 4. The movable member of the valve comprises a disk 5 adapted to coact with the seat 3 and formed of some suitable flexible material, such for example as rubber, which is clamped upon a stem 6 between upper and lower rigid washers 7 and 8 respectively. Nuts 9 are screwed upon the stem 6 for clamping the disk 5 and the washers 7 and 8 against a shoulder 10.

The flexible disk 5 is formed with a concave upper surface, which bears against the convex lower surface of the upper washer 7. The bearing of both washers against the disk 5 is materially less than the diameter of said disk, as shown, and is less than the inner diameter of the seat 3. This construction permits said disk to have the greatest amount of flexibility consistent with the necessary strength. The disk 5 is normally flat, as shown by the dotted lines in Fig. 1, but when said disk is seated upon the seat 3, the pressure of the fluid upon its upper surface causes it to be slightly dished, as shown in full lines, thereby insuring positive and tight seating. The dishing of the disk 5, when seated, also increases the area of its contact with the upper rigid washer 7, as shown in said full line position, thereby reducing the flexibility of said disk, after it is fully seated, to prevent it from being dished beyond the point necessary to provide complete seating. Thus my construction provides both sufficient flexibility in the disk to allow it to seat properly, and sufficient rigidity in said disk, when seated, to insure the maintenance of a tight valve.

The upper portion of the stem 6 operates in a guide 11, formed in the usual manner, and is preferably provided with longitudinal grooves, one of which is shown at 12, to prevent compression above said stem in said guide 11. The lower end of the stem 6 passes through a guide way formed in a central boss 13 of the bridge 4. Said boss forms a stop, by coacting with a shoulder 14 on the stem 6, to prevent the disk 5 from being dished too much by extreme fluid pressure on its upper surface. The lower end of the upper guide 11 acts as a stop to limit the lift of the valve. If desired, the lower guide may be omitted, in which case the upper guide 11 and the upper end of the stem 6 should be made longer, to properly guide the valve, but as such construction is obvious, and is not essential to the operation of the device, it has been omitted from the drawing. In case the lower guide is dispensed with, the stem 6 would end at the shoulder 14, and such lower end would abut against the boss 13 of the bridge 4 to form a stop as in the form shown.

It should be noted that the movable member of my valve is extremely light, and therefore capable of quickly lifting to its maximum opening. This minimizes cutting of the valve and seat, and permits a free flow of the fluid. The width and tapered form of the seat 3, and the flexibility of the disk 5, due to its construction and mounting, permit positive closing of the valve, while the stop formed by the bridge 4 protects the disk 5 against injury from extreme fluid pressures.

I claim:

A slush-pump valve assembly comprising a fixed seat member having an annular inwardly tapered seat; a flexible normally flat valve disk adapted to cover and uncover said seat, said disk having a centrally disposed concavity formed in the face opposite to its seating face; a rigid convex washer fitted to the concavity of said disk, the area of contact between said washer and said disk being normally of less diameter than the inner diameter of said seat and increasing as said disk is dished by its contact with said seat; a second rigid washer, of less diameter than the interior diameter of said seat, fitted to the seating face of said disk; a stem extending through said washers and said disk; means for securing said washers and said disk upon said stem; and means for movably supporting said stem.

In testimony whereof I have signed my name to this specification.

PAUL ROBERT GEORGE BIEDERMANN.